Feb. 1, 1944.  G. G. WILEY  2,340,634
TRAFFIC COUNTING APPARATUS
Filed Feb. 19, 1940  3 Sheets-Sheet 1
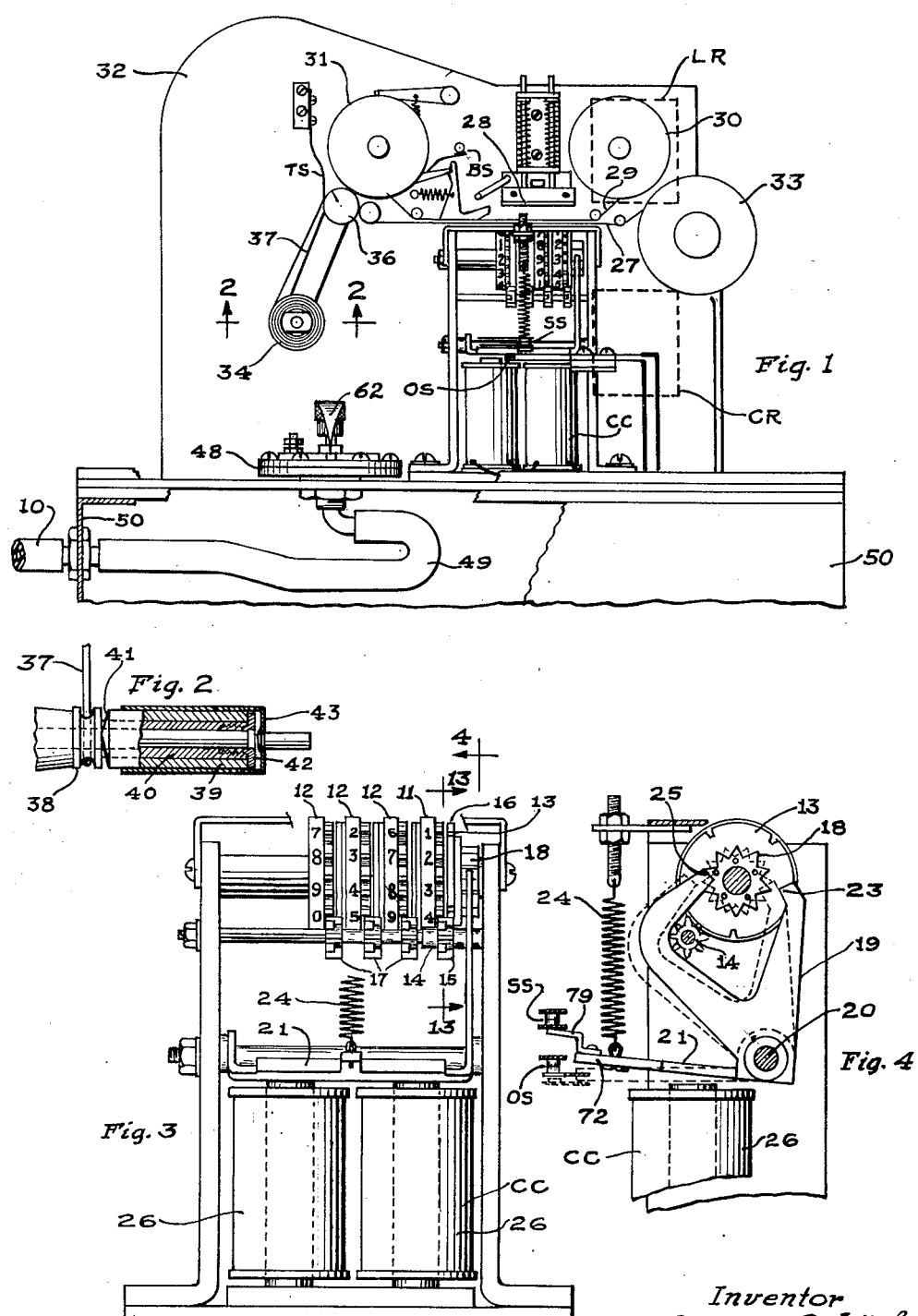
Inventor
George G. Wiley.
By Roland C. Rehm
Attorney.

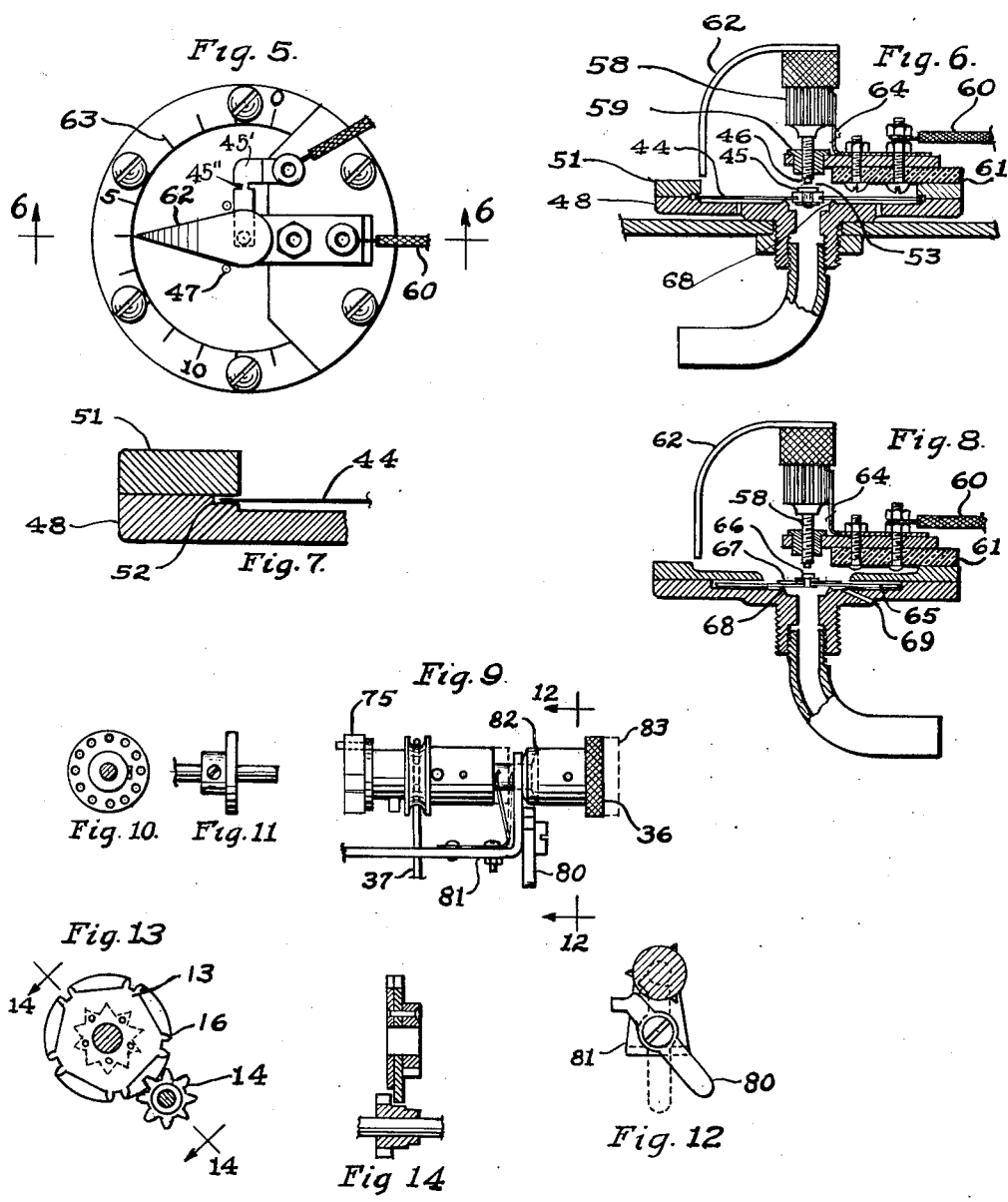

Feb. 1, 1944.  G. G. WILEY  2,340,634
TRAFFIC COUNTING APPARATUS
Filed Feb. 19, 1940  3 Sheets-Sheet 3

Inventor
George G. Wiley.
By Roland C. Rehm
Attorney.

Patented Feb. 1, 1944

2,340,634

UNITED STATES PATENT OFFICE 2,340,634

TRAFFIC COUNTING APPARATUS

George G. Wiley, Chicago, Ill., assignor to Streeter-Amet Company, Chicago, Ill.

Application February 19, 1940, Serial No. 319,667

2 Claims. (Cl. 234—12.5)

This invention relates to traffic counters and, among other objects, aims to provide an improved and reliable apparatus for counting vehicular and other traffic.

The nature of the invention may be readily understood by reference to one illustrative apparatus embodying the invention and shown in the accompanying drawings.

In said drawings:

Fig. 1 is an elevation of a recording counter with the cover removed;

Fig. 2 is an axial section of a tape rewind roll;

Fig. 3 is an elevation of the counting mechanism;

Fig. 4 is a sectional elevation thereof taken from the plane 4—4 of Fig. 3;

Fig. 5 is a plan view of a detector diaphragm and its associated mechanism;

Fig. 6 is a section thereof taken on the plane 6—6 of Fig. 5;

Fig. 7 is a fragmentary section showing on an enlarged scale a portion of the section of Fig. 6;

Fig. 8 is a section similar to Fig. 6 showing a different form of detector diaphragm;

Fig. 9 is an elevation of the clock driven tape driving roll;

Fig. 10 is a section taken on the plane 10—10 of Fig. 9 illustrating the clutch for effecting a driving connection between the clock shaft and the tape driving roll;

Fig. 11 is a side elevation of the clutch disc;

Fig. 12 is a section taken on the plane 12—12 of Fig. 9 illustrating a device for holding the tape driving roll in inoperative position;

Fig. 13 is a section taken on the plane 13—13 of Fig. 3 illustrating the auxiliary wheel of the counter mechanism;

Fig. 14 is a section thereof taken on the plane 14—14 of Fig. 13;

Figure 15:
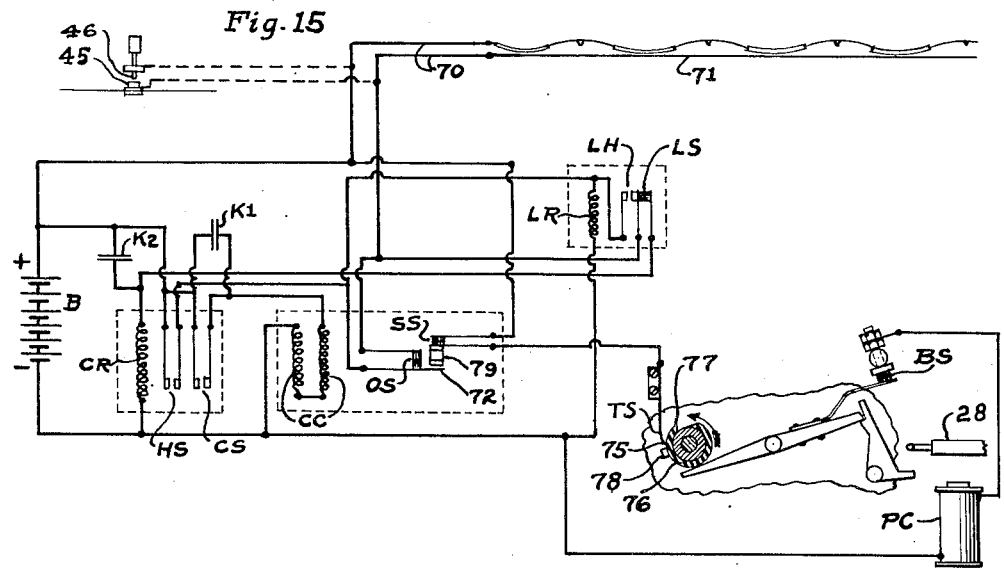
Fig. 15 is a diagram illustrating the electrical controlling circuits of the apparatus.

The invention is here shown embodied in portable apparatus adapted to count vehicular and similar traffic. Counting of vehicular traffic presents problems not encountered in the general art of counting. In passing the point at which a count is taken, the vehicles may travel either very rapidly or very slowly; they may pass close to or distant from the counting device resulting in variation in the strength of impulses delivered to the counting device; and several vehicles may pass the point of count almost simultaneously. Because of the latter circumstances, a photo-electric cell (electric eye) cannot be successfully employed. It cannot differentiate between the passage of a single vehicle and of a plurality of overlapping vehicles which would result in the sending out of only one impulse to the counting device.

Knowledge of traffic flow becomes relatively more important on roads where traffic is heavy, i. e. when two or more vehicles travel abreast or nearly so. The counting apparatus must, therefore, be capable of responding to impulses delivered in very rapid sequence and with varying strength.

In the present apparatus, the traffic is detected by a detector strip extending transversely across the roadway. The strip may be in the form of an electric road strip, such as shown in Paver Patent No. 2,163,960 and Basquin Patent No. 2,156,715, or in the form of a pneumatic tube 10, such as that here illustrated, delivering air impulses to a diaphragm or the like, the latter in turn closing an electric circuit to which the counting device responds. Both types of strips deliver two impulses per vehicle to the counter, one impulse for the front wheels and one for the rear wheels.

The illustrative counting device here shown is an improvement on that disclosed in my copending application, Serial No. 159,877, and in Haegele and Basquin application, Serial No. 109,422, and is equipped to make a time record of the traffic count. As presently will appear, the counting device is adapted to register one count for each two impulses received from the detector strip. In general, the improvements in the counting device are directed to greater reliability and speed. For example, the present counter will respond to impulses of about $\frac{1}{26}$ of a second apart. This corresponds to impulses delivered by the respective front (and rear) wheels of a plurality of vehicles travelling within four feet of being abreast and at about 60 miles per hour.

The counting device comprises a series of conventional counting wheels 11, 12, etc., whose numerals are raised type adapted to print on a record. The number of printing wheels may vary, depending upon the number of digits required; four are employed in the present instance. Since a periodic record is printed and will reveal when the counter has reached its capacity and commenced another cycle, the number of printing wheels need not greatly exceed what is required to accumulate the maximum total likely to be recorded in a single record period. The accumulating mechanism of the counter is not limited to any particular design, that here shown being like the counting mechanism shown in the aforesaid copending applications. As explained in said copending applications, the units wheel 11 is advanced one digit for each two impulses delivered to the counting device by an auxiliary wheel 13. The latter meshes with a pinion 14 having short teeth alternating with long teeth 15 by means of which the units wheel is rotated from one digit to the next for each two movements of the auxiliary wheel 13. Only the long teeth are engaged by auxiliary wheel 13 and the spaced pairs of teeth 16 of the latter (see Fig. 9) engage a long pinion tooth 15 only on alternate movements of the auxiliary wheel. By this mechanism, intermediate positions of the printing digits on the units wheel are prevented. This is important in a printing counter for vehicular traffic inasmuch as an erroneous record would be made if at the instant of printing the units printing wheel were in intermediate position. Accumulations are transferred from one denominational order to the next higher through the conventional pinions 17 which are rotated one digit for each complete revolution (ten digits) of the next lower denominational printing wheel.

As here shown, the auxiliary wheel 13 is rotated by star cam 18 (having ten teeth in this instance) to which it is directly connected. The star cam is rotated one tooth at a time by a double arm operating pawl 19 pivoted at 20 and connected to the armature 21 of solenoid or counter coil CC. When the solenoid is energized, tooth 23 of the pawl is drawn into engagement with the star cam and is so designed as to rotate the star wheel by a camming action through the angular distance of ½ tooth. Upon deenergization of the solenoid, spring 24 draws the opposite pawl tooth 25 into engagement with the star wheel to advance the latter through a similar angle. The work of turning the star wheel and the counting wheels is thus expended throughout the cycle of the operating pawl, thereby substantially reducing the inertia of the star wheel and the counting wheels (for a given speed or frequency of operation) as compared to what it would be if the entire angular movement of the star wheel were effected on one movement of the pawl. In the present instance, the star wheel makes two revolutions for each revolution of the units printing wheel 11.

Tooth 25 of the operating pawl is normally in engagement with the star cam and holds the printing wheels against movement and also serves to register the type on the units wheel (and as a consequence the type on all other wheels) in printing position.

The counter operating solenoid CC, in this instance, comprises two magnet coils 26 connected in series. They may advantageously be operated by a six volt storage battery. The armature 21 is relatively light in weight and, by utilizing both the forward and return movements of the operating pawl to effect rotation of the star cam, a very substantial increase in speed results (with a given inertia), the apparatus in the present instance being capable of about 26 cycles per second.

As more particularly illustrated in said copending applications, the type carrying counting wheels are employed to print the record in this instance on a tape 27 conducted across the face of the type but spaced very slightly therefrom. A printing hammer 28 is periodically actuated to impress the tape on the printing wheels. Ink is furnished by an inking ribbon 29 unwound from spool 30 and upon spool 31 and vice versa. A clock enclosed within housing 32 feeds the tape, unwinding it from roll 33 and upon roll 34, and periodically energizes printing hammer solenoid core PC. The details of the tape and ribbon operating mechanism and printing coil actuating mechanism are disclosed in said copending applications and description thereof need not be repeated here.

In Fig. 2 is illustrated an improved rewinding spool 35 on which the record tape is rewound. The roll is driven from the tape driving roll 36 through a belt 37 which advantageously may be in the form of an elastic rubber band adapted to slip on the rewind pulley 38 when the diameter of the rewound roll 34 increases to a point where its peripheral speed exceeds the rate of feed of the tape. The rewind spool comprises an outer sleeve 39 having a friction connection with the inner driving sleeve 40 in the form of a washer-like spring 41 pressing against the end of outer sleeve 39. A screw 42 threaded into the inner sleeve presses the outer sleeve into frictional contact with the spring 41. The outer sleeve is otherwise free on the inner sleeve and is capable of slipping on the latter as the circumference of the rewound roll 34 increases and makes slower rotation necessary. The tape is wound upon a removable U-shaped spring clip 43 frictionally fitting over the outer sleeve 39. When withdrawn, the clip carries with it the rewound tape.

As described in said copending applications, the tape advantageously is previously printed with the time intervals at which a record is to be made. In adjusting a tape roll the time readings thereon are adjusted on the clock driven sprocket 36 to synchronize with the clock to bring the proper time reading in registry with printing position. The clock may advantageously be employed to effect the printing of count by closing the circuit through the printing hammer coil PC once each hour, as explained in said copending applications. The rewound roll 34 may be removed at any time simply by severing the tape (preferably without disturbing the setting of the tape on the driving roll 36) and the free end of the tape (which is left long enough for the purpose) may be again started on the rewind spool.

When the pneumatic detector tube 10 is employed, as here illustrated, the air impulses (created by vehicles crossing the tube) impinge against a detector in the form of a diaphragm 44 carrying a contact point 45, in this instance insulated from the diaphragm and deflectable into engagement with contact 46 to complete a circuit through the counter coil CC. Contact 45 is connected with its lead wire through a flexible conductor blade 45' mounted on the insulation 61 (Fig. 5). Blade 45' is advantageously arranged to press lightly against the diaphragm to minimize the effect of secondary oscillations and to insure separation of the contact points after each impulse. It is made of some elastic material, such as Phosphor bronze. Preferably the blade is reduced in section at an intermediate point (45'') to reduce resistance to flexure under the impulses of the diaphragm. The diaphragm is designed to minimize the effect of auxiliary or secondary air wave oscillations produced by certain types of impacts on the detector tube 10. Preferably it is made from a thin sheet of elastic material of such flexibility that it will deflect adequately only under primary impulses from the detector tube and substantially less under secondary impulses. I have found that a sheet of vinyl resin (such as the product sold under the tradename of "vinylite") of about .005" provides a diaphragm having the desired uniform flexibility throughout an adequate temperature range, i. e. from —30° F. to 130° F. Preferably a number of holes 47, in this instance three of No. 60 drill size, i. e., .040" diameter, are formed in the diaphragm to vent the tube 10 (by equalizing pressures on opposite faces of the diaphragm) and to reduce the severity of sharp impacts on the tube 10, and to damp out auxiliary oscillation in the air column.

The tube 10 is preferably closed, that is, at its opposite end, to prevent the entrance of moisture and water into the tube. It is connected with the diaphragm housing 48 through a lead-in tube 49 passing through battery housing 50. Housing 48 and the annular ring 51 screwed thereto provide a groove 52 for sealing the margins of the diaphragm. The groove is slightly larger than the diaphragm (allowing in this case about 1/64 of an inch clearance) to prevent permanent stretching or distortion of the diaphragm which would otherwise occur if the margins were immovably or tightly clamped in the housing. The loose mounting of the diaphragm thus avoids distortion of the latter, and it is, therefore, possible to maintain a constant clearance 53 between contact points 45 and 46 adequate to prevent closing of the circuit in minor fluctuations of the diaphragm and yet not so great as to result in failure of the closing of the contact when a slowly moving vehicle (producing a light impulse) crosses the detector strip. Distortion of the diaphragm through expansion and contraction on temperature changes also is prevented by the floating mounting; also the clearance around the margins of the diaphragm allow an additional venting space for damping out minor oscillations and minimizing the effect of hard and rapid impacts on the detector strip caused by rapidly moving vehicle and double-tired trucks.

The detector tube in this instance has an internal diameter of 3/16 of an inch and a wall thickness of 1/8 of an inch. It may advantageously be made of gum rubber. The tube is stretched across a roadway and connected at opposite ends to stakes 54 which may be driven into the ground along the edges of a highway. When applied to a roadway having a curb and adjacent sidewalks, the stakes may, as illustrated in Fig. 13, be driven into the joint between the curbing and the roadway proper. The natural resilience of the tube provides sufficient tension to maintain the tube taut and to restore it to position in the event it is deflected by passing vehicles.

Figure 16:
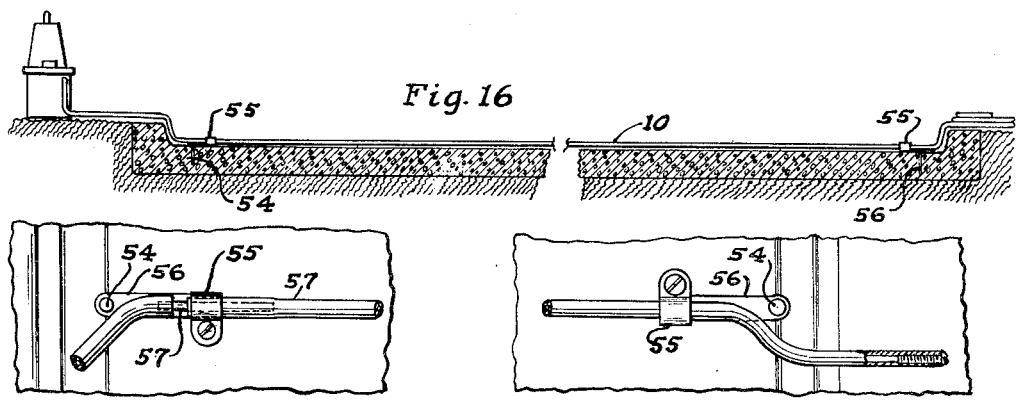
Fig. 16 is a section through a roadway illustrating the manner of application of the pneumatic detector tube.
Figure 17:
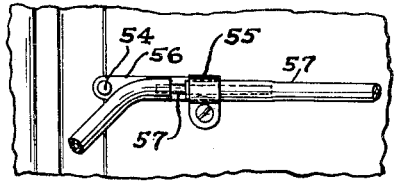
Fig. 17 is a plan view (on a larger scale) illustrating the manner of anchoring one end of the tube.
Figure 18:
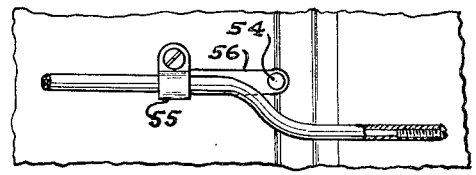
Fig. 18 is a similar view illustrating the manner of anchoring the other end of the tube.

In Figs. 16, 17 and 18 there is illustrated one method of applying the pneumatic detector tube to a roadway. As there shown, the tube is clamped adjacent its blank end in a sheet metal anchor 55 having a perforated projecting extremity 56 through which the anchor stake 54 is driven. The latter may advantageously be driven into the joint which usually occurs between the paving slab and the curb slab. As shown, any surplus tube may project beyond the clamp. The end of the tube is preferably closed by a plug or the like which prevents the entrance of moisture or dirt. The tube is then placed under enough tension to keep it taut (the tube being sufficiently elastic for this purpose) and its end anchored by a similar anchor 55 which is similarly held by a stake 54. To prevent closing or restriction of the tube by pinching in the latter clamp, a metal sleeve 57 (whose internal diameter is preferably the same as that of the tube) is preferably inserted in the tube at the clamp. This sleeve also serves as a means for connecting the short section of tube leading to the counter.

Sudden and sharp impacts on the tube tend to set up a series of gradually decreasing auxiliary oscillations in the tube. Appreciable auxiliary oscillations are also frequently caused by double-tired trucks which compress a substantial length of the tube and compress and confine the air in the length of the tube between the wheels, which air when released tends to oscillate. The spacing 53 between the contact points is, therefore, preferably adjusted to prevent chattering of the diaphragm under the influence of the aforesaid auxiliary oscillations from closing the circuit. To provide proper adjustment, contact 46 advantageously comprises a thumb screw 58 carried in a threaded nut in bracket 59. Contact 46 and the lead wire 60 are insulated from the ground by insulation 61 between the bracket and the diaphragm housing from the ground. Thumb screw 58 advantageously carries a pointer 62 travelling over a scale 63 on ring 51 to indicate the clearance in thousandths of an inch between contacts 45 and 46. Preferably the thumb screw is provided with a series of stop notches engaged by spring finger 64 to hold the thumb screw in adjusted position. The spacing between the notches in this case represent an adjustment of .001 of an inch. To adjust the proper clearance between the contact points 45 and 46, the thumb screw may be advanced until the electrical contact is made. This represents zero clearance. If desired, the pointer 62 may be calibrated by then setting it at zero. In any event, the thumb screw is then rotated to provide proper clearance which, in this instance, is from .004 to .016 of an inch. For a detector tube of about 50 feet in length (for a 40 foot roadway plus a a ten foot lead to the apparatus), a contact gap of about .009" has been found to be quite satisfactory. With a contact point clearance of this amount, the device is sufficiently sensitive to be actuated by a slowly moving vehicle and yet not so sensitive as to cause chattering (i. e. a plurality of contacts) under the influence of auxiliary oscillations.

The most effective contact gap will vary with the length or volume of the detector tube, and it is desirable after installation of the apparatus to set the contact gap (by adjustment of thumb screw 58) so that it will be closed by a slowly moving vehicle crossing the far end of the tube but great enough not to be closed by secondary oscillations created by a rapidly moving vehicle crossing the near end of the tube.

In the construction illustrated in Fig. 8, the vinyl resin diaphragm is replaced by a rubber diaphragm 65, in this instance made of gum rubber about 1/64 of an inch in thickness. As in the other form, the margins of the diaphragm are not tightly clamped, about 1/64 of an inch clearance being allowed. The diaphragm contact is in the form of a rivet 66 which serves to attach both the conductor blade 45' and a relatively rigid disc 67. The latter covers the major portion of the exposed central part of the outer face of the diaphragm and prevents downward flexure thereof under the suction impulse which follows each pressure impulse in the detector tube. An upwardly extending projection in the form of an annular rib 68 integral with the diaphragm housing prevents substantial downward movement of the diaphragm independently of the disc 67. The rib 68 does not, however, prevent free upward movement of the diaphragm in response to impulses nor its upward flexure independently of the disc. The latter, in conjunction with the projection 68, minimizes fluttering of the highly flexible diaphragm and limits the gap between the contact points. A rib 68 or its equivalent may also advantageously be employed in connection with diaphragm 44 to limit downward oscillation. Because of the greater flexibility of the rubber diaphragm, this gap should be between .014 and .038 inches. A satisfactory average gap is .027 inches for a detector tube for a 40 foot roadway. The diaphragm housing is preferably additionally vented by a small passage 69 (in this instance the size of a No. 60 drill). This coupled with the venting around the margin of the diaphragm minimizes the effect of strong impulses and reduces the secondary impulses caused by oscillations in the air column.

In Fig. 15 is illustrated one arrangement of control circuits for the illustrative recording counter. The latter is provided with lead-in wires 70 adapted to convey impulses received either from an electric road strip 71 or from the diaphragm contacts 45 and 46. Whether a pneumatic detector tube or an electric road strip 71 is employed depends upon the preferences of the user. Electric power is supplied by a conventional six volt storage battery carried inside the battery case 50. The necessity for portability of the apparatus places a limitation upon the source of power and requires the efficient use of that power to avoid rapid depletion of the battery. Were it not for these circumstances, many of the problems incident to conservation of power would be eliminated. Because of the extremely short duration of the impulses received, among other reasons, a contact relay CR is placed in the detector circuit. This relay controls a pair of normally open switches HS and CS controlling respectively a holding circuit for the contact relay CR and a circuit through the counter coil CC. Thus, when an operative contact is made by a vehicle the detector or impulse circuit closed thereby includes B+, the detector and lead-in wires 70, a lock-out switch LS (presently described), CR and B—. When the contact relay CR is energized, switches HS and CS close the following circuits: (1) Holding circuit B+, HS, counter operated switch OS (presently described), contact LS, CR and B—, the latter circuit serving to hold switches HS and CS closed until completion of a counter operation regardless of the shortness of closing of the detector or impulse circuit. (2) The counter circuit controlled by the companion switch CS, B+, CS, counter coil CC to B—. Energization of the counter coils CC operates the counter. Associated with the counter is a normally closed counter operated switch OS opened by the arm 72 projecting from and carried by the counter armature 21 when the latter has completed its "forward" movement, i. e., when the point 23 of the pawl has moved to its dotted line position (Fig. 4) in partially rotating the star cam. Opening of the counter operated switch OS breaks the counter relay holding circuit with the resultant opening of switches HS and CS. It should be noted that the counter operating circuit does not include the detector or impulse circuit and is, therefore, of constant resistance. This resistance is relatively low in order to provide sufficient power for operating the counter.

To protect the battery against depletion and the counter from overheating in the event of a short circuit in the impulse circuit, a protective or lock-out relay LR is included in the counter controlling circuits. The lock-out relay is of relatively high resistance and consumes little energy. It controls the normally closed switch LS and a normally open holding switch LH. A short circuit generally occurs when an electric road strip 71 is employed and a vehicle comes to rest on the road strip. Short circuits also may occur, though infrequently, at the diaphragm contact points. The circuit through the lock-out relay LR is a parallel circuit around the counter relay CR but controlled by the relay holding switch HS. While the lock-out relay LR receives an impulse each time holding switch HS is closed, lock-out relay coil is designed with high inductance so that it is slow in operating. Normally, therefore, the counter cycle has been completed and the holding switch HS opened before the lock-out relay LR can operate to open lock-out switch LS. However, if the circuit through the counter relay be relatively prolonged (as where a short circuit occurs), the lock-out relay can then be energized through the following circuit: B+ to HS to LR to B—. In this connection it should be noted that when a short circuit occurs the counter operated switch OS cannot effect deenergization of the counter relay and the counter coils since the short circuit maintains the counter relay energized. Opening of lock-out switch LS, however, breaks the circuit through the counter relay CR and results in deenergization of that relay and the counter coil CC.

The lock-out relay switch LH controls a circuit for maintaining the lock-out relay energized during existence of a short circuit. Such a holding circuit extends from B+ through the short-circuited detector, lines 70 to LH, through the holding relay LR to B—. The high resistance of the lock-out relay coil prevents the flow of a substantial current (it consumes only about 75 milliamperes) and, therefore, does not substantially deplete the battery despite the fact that the short circuit may be prolonged.

The lock-out relay also serves to break locks which occur in the counter between the star cam and its pawl. Such a lock may result when the interval between successive impulses in the impulse circuit is too rapid to permit the point 25 of the counter pawl to complete its return movement. In such event the point 23 of the pawl (moving inwardly upon the next energization of the counter coil CC) strikes the star cam on dead center, i. e., it strikes a point of the tooth of the star cam and, therefore, prevents the counter armature 21 from descending far enough to open the counter operated switch OS to break the counter circuit. Thus the circuit through both the counter relay CR and the counter coil CC would be prolonged and would quickly deplete the battery were it not for the protection afforded by the lock-out relay LR. When the aforesaid circuits are prolonged, as stated above, sufficient time is allowed to complete the energization of lock-out relay LR to open the lock-out switch LS, thereby deenergizing the counter coils as aforesaid and breaking the lock in the counter.

Condensers K are placed across all points involving any substantial sparking. As here shown, condenser K—1 is placed across switch CS and condenser K—2 is so located as to protect switches LS, OS and HS.

The printing hammer operating coil PC is operated in the same manner as described in said copending applications. The controls therefor are illustrated diagrammatically in Fig. 15. The clock driven tape driving roll (Fig. 9) carries a contact 75 adapted periodically to be engaged by the timer switch TS. Such contact establishes the following circuit: B+ through counter operated switch SS to timer switch and thence to the ground and from the ground through breaker switch BS to the printing coil PC and thence to B—. In this connection it should be noted that the breaker mechanism, together with the contact 75, is not insulated from the clock mechanism and is, therefore, grounded. When the printing hammer 28 descends, it opens the breaker switch BS, as described in said copending applications. A separate breaker is advantageously employed because the contact 75 rotates relatively slowly (being driven by the minute hand shaft of the clock), and, therefore, cannot be conveniently used to break the circuit through the printing coil PS. The idle portions of contact 75 are surrounded by insulation 76 which terminates abruptly at 77 to permit a sharp and quick contact by switch TS. The same shaft carries a cam member 78 which resets the breaker as described in said copending applications.

Counter operated switch SS functions to prevent operation of the printing hammer simultaneously with the operation of the counter. Such simultaneous operation (involving as it would movement of one or more type wheels when impressed by the printing ribbon) would blur the record. Switch SS is normally closed and is opened only during the interval of movement of the units and possibly other printing wheels. As here shown, switch SS tends to open but is held closed by the projection 79 carried by the counter armature 21. When the latter descends switch SS opens, thereby rendering the printing coil circuit inoperative until the counter has completed its cycle.

During idle periods and whenever the recording mechanism is not required, the tape driving mechanism is preferably rendered inoperative to avoid waste of tape. For this purpose the tape driving roll (described in detail in my aforesaid copending application) may be held in its retracted position, i. e., disconnected from the clutch plate (Figs. 10 and 11) by locking lever 80. The latter is pivoted to the bracket 81 and may be swung behind the tape roll section 82 when the latter is retracted to its dotted line position 83 (see Figs. 9 and 12).

Obviously the invention is not limited to the details of the illustrative apparatus herein described since these may be variously modified. Moreover, it is not indispensable that all features of the invention be used conjointly since various features may be used to advantage in different combinations and sub-combinations.

Having described my invention, I claim:

1. Portable traffic counting apparatus comprising in combination counter mechanism including a plurality of printing type wheels representing units and succeeding denominational orders, counter-operating mechanism adapted to operate on weak electric signals and including a star cam for rotating said type wheels, and an oscillating pawl having a pair of opposite cams alternately partially rotating said star wheel on each oscillation, a solenoid for moving said pawl for one oscillation and a spring for effecting its return oscillation, a storage battery for supplying electric energy to operate said counter, means responsive to passing vehicular traffic for delivering relatively weak electric impulses to said solenoid, means for shifting said units type wheel in a single movement to bring the next succeeding digit into printing position with the printing means for every two complete cycles of said operating pawl and for preventing said units wheel from assuming a position relative to printing position intermediate two digits, means independent of the operation of said counter for periodically printing a record from said type wheels, and means operated by the movement of said pawl for breaking the electric circuit through said solenoid.

2. A battery-operated portable traffic counting apparatus adapted to operate on weak signals comprising in combination a counter having a series of printing counting wheels representing units and succeeding denominational orders, means including a star wheel cam for rotating said units wheel in a single movement from one digit to the next for each four increments of movement of said star wheel, said means preventing said units wheel from assuming a position intermediate two units digits, an oscillating pawl having opposed cam elements alternately engaging said star wheel to give the latter successive increments of movement, a battery-operated low voltage solenoid for operating said pawl in one direction, a spring for oscillating the same in the other direction, means responsive to passing vehicular traffic for delivering weak electric signals to said solenoid, printing means operating independently of said counter for periodically making a record from said printing means, and means operated by said pawl for breaking the circuit through said solenoid.

GEORGE G. WILEY.